US012764501B2

(12) United States Patent
Fujishiro et al.

(10) Patent No.: US 12,764,501 B2
(45) Date of Patent: Oct. 13, 2026

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 403 days.

(21) Appl. No.: 18/305,084

(22) Filed: Apr. 21, 2023

(65) Prior Publication Data

US 2023/0262423 A1 Aug. 17, 2023

Related U.S. Application Data

(63) Continuation of application No. PCT/JP2021/038910, filed on Oct. 21, 2021.

(60) Provisional application No. 63/104,044, filed on Oct. 22, 2020.

(51) Int. Cl.
*H04W 4/06* (2009.01)
*H04W 76/20* (2018.01)

(52) U.S. Cl.
CPC ............. *H04W 4/06* (2013.01); *H04W 76/20* (2018.02)

(58) Field of Classification Search
CPC ....... H04W 4/06; H04W 76/20; H04W 76/27; H04W 76/40; Y02D 30/70
See application file for complete search history.

(56) References Cited

U.S. PATENT DOCUMENTS 10,506,477 B2 12/2019 Jung et al.
10,542,530 B2 1/2020 Chen et al.
10,939,335 B2 3/2021 Jung et al.
11,337,202 B2 5/2022 Chen et al.
2013/0121274 A1 5/2013 Chen et al.
2014/0044072 A1 2/2014 Piggin et al.
2015/0195753 A1 7/2015 Jung et al.
2017/0302465 A1 10/2017 Wang et al.
2021/0168786 A1 6/2021 Takano
(Continued)

FOREIGN PATENT DOCUMENTS

JP 2014-511600 A 5/2014
JP 2014-533910 A 12/2014
(Continued)

OTHER PUBLICATIONS

"3rd Generation Partnership Project; Technical Specification Group Radio Access Network; NR; NR and NG-RAN Overall Description; Stage 2"; Release 16; 3GPP TS 38.300 V16.3.0 (Sep. 2020); Sep. 2020; pp. 1-148.
(Continued)

*Primary Examiner* — Jae Y Lee
(74) *Attorney, Agent, or Firm* — Studebaker Brackett PLLC

(57) ABSTRACT

Provided is a communication control method used in a mobile communication system providing a multicast and broadcast service (MBS) from a base station to a user equipment and includes receiving, by the user equipment in an RRC connected state and from the base station, unicast signalling including an MBS configuration used for MBS reception, and performing, by the user equipment having transitioned from the RRC connected state to an RRC idle state or an RRC inactive state, the MBS reception by using the MBS configuration received in the RRC connected state.

3 Claims, 18 Drawing Sheets

(56) References Cited

U.S. PATENT DOCUMENTS

| | | | | |
|---|---|---|---|---|
| 2022/0124766 | A1* | 4/2022 | Jung | H04W 72/044 |
| 2022/0217700 | A1 | 7/2022 | Takano | |
| 2022/0338070 | A1* | 10/2022 | Wang | H04W 36/008357 |
| 2023/0189295 | A1* | 6/2023 | Baek | H04W 76/40 370/312 |
| 2023/0276458 | A1* | 8/2023 | Lee | H04W 72/232 370/329 |
| 2023/0379943 | A1* | 11/2023 | Wang | H04W 72/30 |
| 2023/0403759 | A1* | 12/2023 | Li | H04W 72/30 |

FOREIGN PATENT DOCUMENTS

| | | | |
|---|---|---|---|
| JP | 2017-103811 | A | 6/2017 |
| JP | 2017-537534 | A | 12/2017 |
| WO | 2019/116773 | A1 | 6/2019 |

OTHER PUBLICATIONS

LG Electronics Inc.; "Basic function for broadcast/multicast"; 3GPP TSG RAN WG1 Meeting #102-e; R1-2006322; Online; Aug. 17-28, 2020; 4 pages.

Catt; "Consideration on Idle and Inactive mode UEs"; 3GPP TSG RAN WG2#111-e; R2-2006597; Electronic meeting; Aug. 17-28, 2020, 9 pages.

Ericsson; "Basic functions for broadcast/multicast for RRC_IDLE/RRC_INACTIVE UEs"; 3GPP TSG-RAN WG1 Meeting #102-e; R1-2006920; Electronic Meeting; Aug. 17-28, 2020; total 5 pages.

* cited by examiner

COMMUNICATION CONTROL METHOD

RELATED APPLICATIONS

The present application is a continuation based on PCT Application No. PCT/JP2021/038910, filed on Oct. 21, 2021, which claims the benefit of U.S. Provisional Application No. 63/104,044 filed on Oct. 22, 2020. The content of which is incorporated by reference herein in their entirety.

TECHNICAL FIELD

The present invention relates to a communication control method used in a mobile communication system.

BACKGROUND OF INVENTION

In recent years, a mobile communication system of the fifth generation (5G) has attracted attention. New Radio (NR), which is a Radio Access Technology (RAT) of the 5G system, has features such as high speed, large capacity, high reliability, and low latency compared to Long Term Evolution (LTE), which is a fourth generation radio access technology.

CITATION LIST

Non-Patent Literature

Non-Patent Document 1: 3GPP Technical Specification "3GPP TS 38.300 V16.3.0 (2020-09)"

SUMMARY

In a first aspect, a communication control method is a communication control method used in a mobile communication system providing a multicast and broadcast service (MBS) from a base station to a user equipment and includes receiving, by the user equipment in a Radio Resource Control (RRC) connected state and from the base station, unicast signaling including an MBS configuration used for MBS reception, and performing, by the user equipment having transitioned from the RRC connected state to an RRC idle state or an RRC inactive state, the MBS reception by using the MBS configuration received in the RRC connected state.

In a second aspect, a communication control method is a communication control method used in a mobile communication system providing a multicast and broadcast service (MBS) from a base station to a user equipment and includes transmitting, by the base station and to the user equipment, a broadcast message, which includes at least one selected from the group consisting of a first identifier indicating a first MBS session in which a first MBS configuration used for MBS reception is provided by using unicast signalling and a second identifier indicating a second MBS session in which a second MBS configuration used for MBS reception is provided by using broadcast signalling.

In a third aspect, a communication control method is a communication control method used in a mobile communication system providing a multicast and broadcast service (MBS) from a base station to a user equipment and includes transmitting, by the base station providing a plurality of MBS control channels in one cell and to the user equipment, a broadcast message, which includes a Radio Network Temporary Identifier (RNTI) used for reception of an MBS control channel of the plurality of MBS control channels for each of the plurality of MBS control channels.

In a fourth aspect, a communication control method is a communication control method used in a mobile communication system providing a multicast and broadcast service (MBS) from a base station to a user equipment and includes transmitting, by the base station, cell reselection control information including priority information indicating, in cell reselection, a priority per cell or a priority per frequency, and an MBS session identifier associated with the priority information, and performing, by the user equipment in an RRC idle state or an RRC inactive state, the cell reselection by using the priority information corresponding to a desired MBS session identifier, based on the cell reselection control information from the base station.

In a fifth aspect, a communication control method is a communication control method used in a mobile communication system providing a multicast and broadcast service (MBS) from a base station to a user equipment and includes initiating, by the user equipment receiving an MBS session in an RRC connected state, RRC reestablishment processing, and performing cell selection in the RRC reestablishment processing. The performing the cell selection includes preferentially selecting a cell providing the MBS session.

In a sixth aspect, a communication control method is a communication control method used in a mobile communication system providing a multicast and broadcast service (MBS) from a base station to a user equipment and includes receiving, by the user equipment and from the base station, information indicating an initial Bandwidth part (BWP) used by the base station, receiving, by the user equipment and from the base station, an MBS configuration used for MBS reception, and, when the MBS configuration does not include a BWP configuration, performing, by the user equipment, the MBS reception by using the initial BWP.

DESCRIPTION OF EMBODIMENTS

Introduction of multicast and broadcast services to the 5G system (NR) has been under study. NR multicast and broadcast services are desired to provide enhanced services compared to LTE multicast and broadcast services.

In view of this, the present invention provides enhanced multicast and broadcast services.

A mobile communication system according to an embodiment will be described with reference to the drawings. In the description of the drawings, the same or similar parts are denoted by the same or similar reference signs.

Configuration of Mobile Communication System

Figure 1:
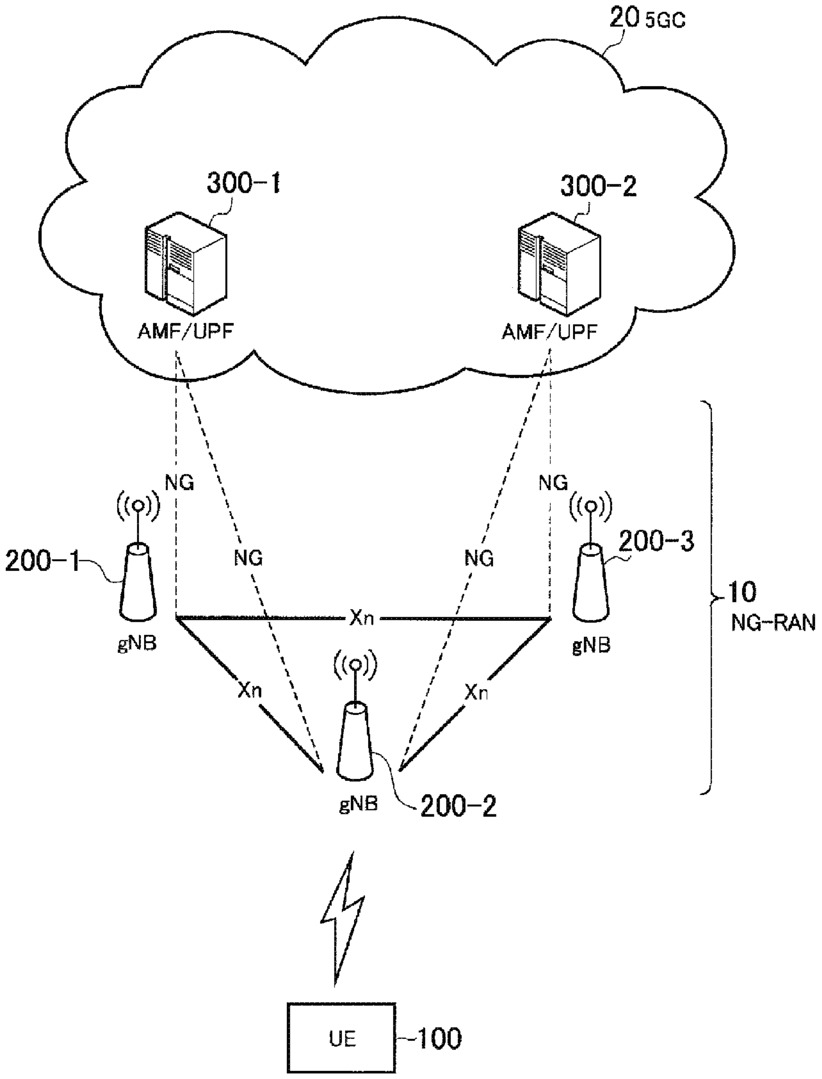
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system according to an embodiment. This mobile communication system complies with the 5th Generation System (5GS) of the 3GPP standard. The description below takes the 5GS as an example, but a Long Term Evolution (LTE) system may be at least partially applied to the mobile communication system, or a sixth generation (6G) system may be at least partially applied thereto.

As illustrated in FIG. 1, the mobile communication system includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signalling. The UPF controls data transfer. The AMF and UPF are connected to the gNB 200 via an NG interface which is an interface between a base station and the core network.

Figure 2:
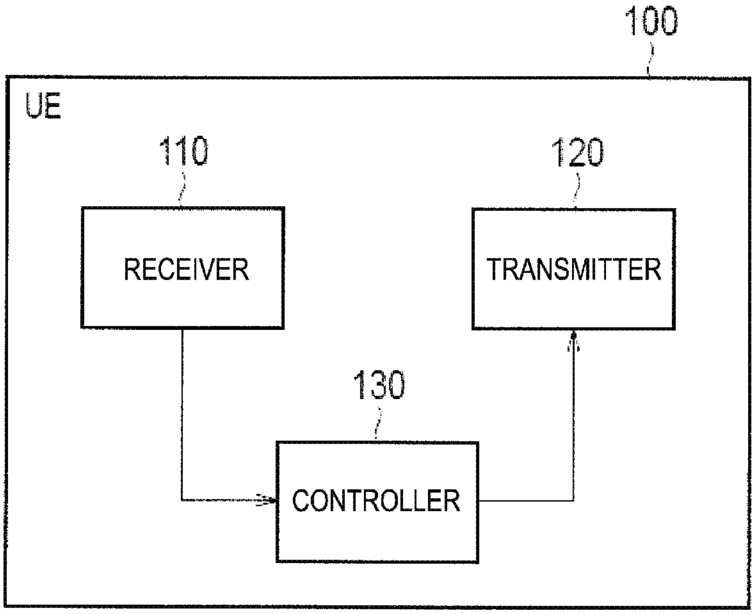
FIG. 2 is a diagram illustrating a configuration of a User Equipment (UE) according to an embodiment.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a central processing unit (CPU). The baseband processor performs modulation and demodulation, coding and decoding, and the like of a baseband signal. The CPU executes the program stored in the memory to thereby perform various types of processing.

Figure 3:
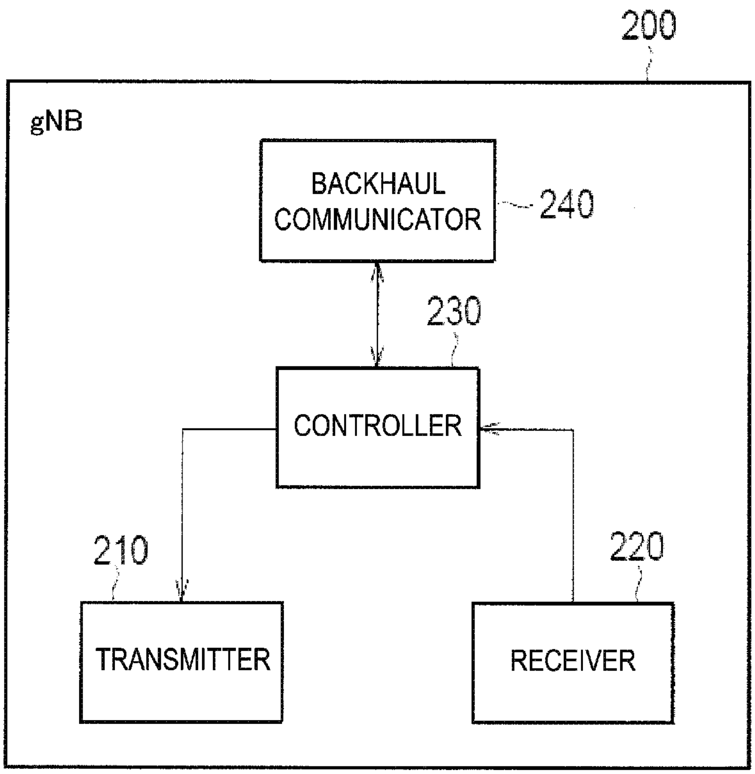
FIG. 3 is a diagram illustrating a configuration of a base station (gNB) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU)

and a Distributed Unit (DU) (i.e., functions are divided), and both units may be connected via an F1 interface.

Figure 4:
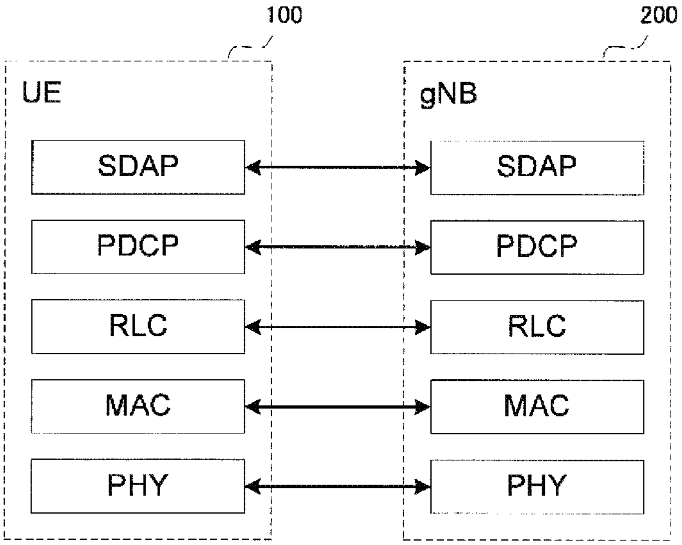
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP may not be provided.

Figure 5:
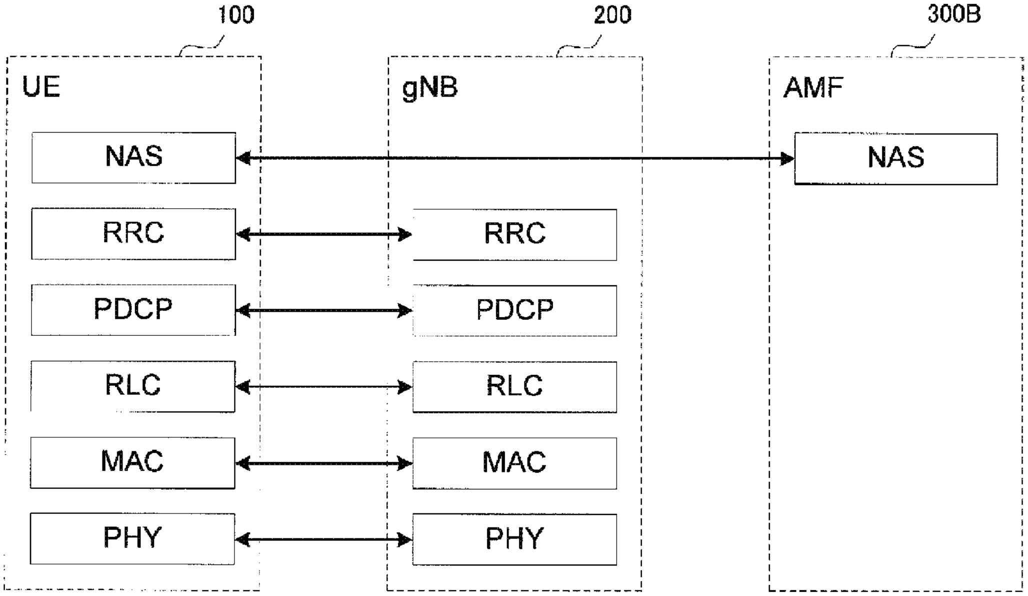
FIG. 5 is a diagram illustrating a configuration of a protocol stack of a radio interface of a control plane handling signalling (control signal).

FIG. 5 is a diagram illustrating a configuration of a protocol stack of a radio interface of a control plane handling signalling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signalling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is higher than the RRC layer performs session management, mobility management, and the like. NAS signalling is transmitted between the NAS layer of the UE 100 and the NAS layer of an AMF 300B.

Note that the UE 100 includes an application layer other than the protocol of the radio interface.

MBS

An MBS according to an embodiment will be described. The MBS is a service in which the NG-RAN 10 provides broadcast or multicast, that is, Point To Multipoint (PTM) data transmission to the UE 100. The MBS may be referred to as the Multimedia Broadcast and Multicast Service (MBMS). Note that use cases (service types) of the MBS include public communication, mission critical communication, V2X (Vehicle to Everything) communication, IPv4 or IPv6 multicast delivery, IPTV, group communication, and software delivery.

Figure 6:
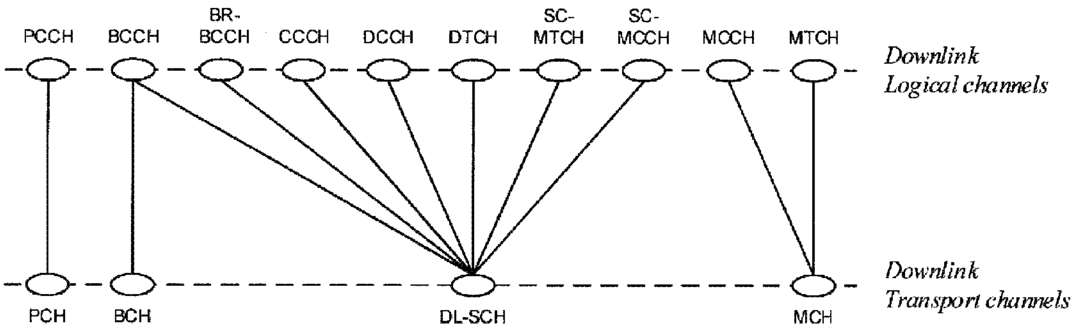
FIG. 6 is a diagram illustrating a correspondence relationship between a downlink Logical channel and a downlink Transport channel according to an embodiment.

MBS Transmission in LTE includes two schemes, i.e., a Multicast Broadcast Single Frequency Network (MBSFN) transmission and Single Cell Point To Multipoint (SC-PTM) transmission. FIG. 6 is a diagram illustrating a correspondence relationship between a downlink Logical channel and a downlink Transport channel according to an embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission, and corresponds to broadcast or multicast data transmission on a cell-by-cell basis. The physical channels used for SC-PTM transmission are a Physical Downlink Control Channel (PDCCH) and a Physical Downlink Shared Channel (PDSCH), and enables dynamic resource allocation.

Although an example will be mainly described below in which the MBS is provided using the SC-PTM transmission scheme, the MBS may be provided using the MBSFN transmission scheme. An example will be mainly described in which the MBS is provided using multicast. Accordingly, the MBS may be interpreted as multicast. Note that, the MBS may be provided using broadcast.

MBS data refers to data transmitted using the MBS, an MBS control channel refers to the MCCH or SC-MCCH, and an MBS traffic channel refers to the MTCH or SC-MTCH. Note that the MBS data may be transmitted using unicast. The MBS data may be referred to as an MBS packet or MBS traffic.

The network can provide different MBS services for respective MBS sessions. The MBS session is identified by at least one selected from the group consisting of a Temporary Mobile Group Identity (TMGI) and a session identifier, and at least one of these identifiers is referred to as an MBS session identifier. Such an MBS session identifier may be referred to as an MBS service identifier or a multicast group identifier.

Figure 7:
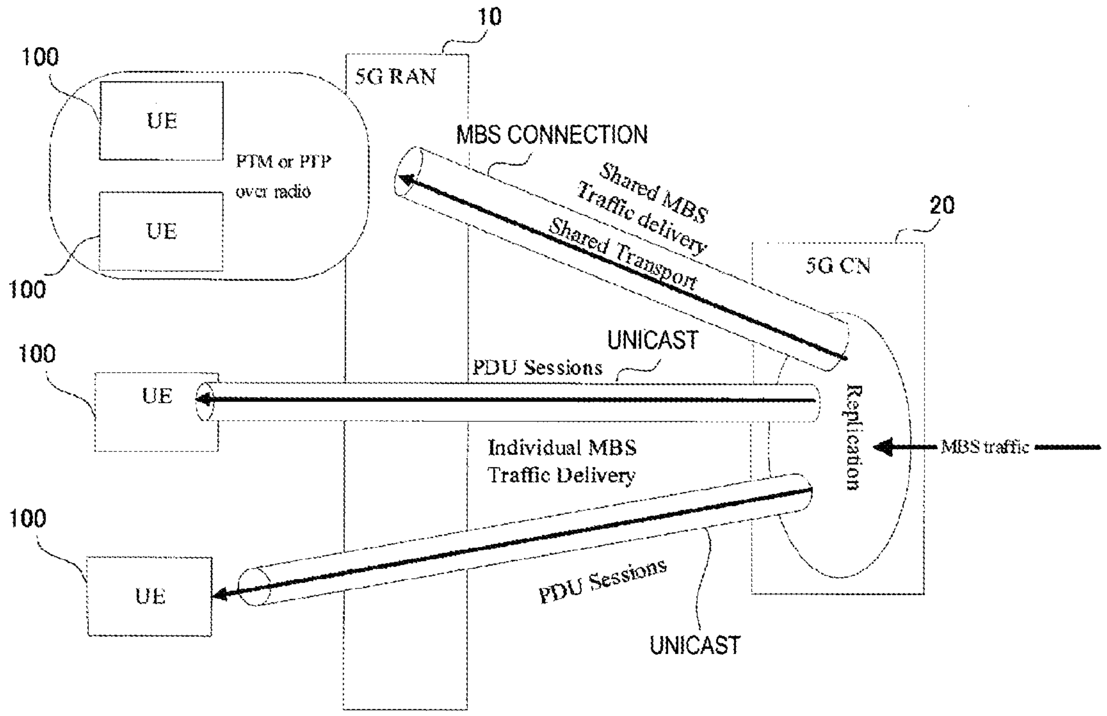
FIG. 7 is a diagram illustrating a delivery method of MBS data according to an embodiment.

FIG. 7 is a diagram illustrating a delivery method of the MBS data according to an embodiment.

As illustrated in FIG. 7, the MBS data (MBS Traffic) is delivered to a plurality of UEs from a single data source (application service provider). The 5G CN (5GC) 20 being a 5G core network receives the MBS data from the application service provider, creates a copy (performs Replication) of the MBS data, and delivers the MBS data.

From the point of view of the 5GC 20, two delivery methods, i.e., shared MBS data delivery (Shared MBS Traffic delivery) and individual MBS data delivery (Individual MBS Traffic delivery), are possible.

In the shared MBS data delivery, connection is established between the NG-RAN 10 being a 5G radio access network (5G RAN) and the 5GC 20, and the MBS data is delivered from the 5GC 20 to the NG-RAN 10. In the following description, such connection (tunnel) is referred to as "MBS connection".

The MBS connection may be referred to as Shared MBS Traffic delivery connection or shared transport. The MBS connection is terminated in the NG-RAN 10 (that is, the gNB 200). The MBS connection may correspond to the MBS session on a one-to-one basis. The gNB 200 selects one of Point-to-Point (PTP: unicast) and Point-to-Multipoint (PTM: multicast or broadcast) by its own determination, and transmits the MBS data to the UE 100 using the selected method.

In contrast, in the individual MBS data delivery, a unicast session is established between the NG-RAN 10 and the UE 100, and the MBS data is individually delivered from the 5GC 20 to the UE 100. Such unicast may be referred to as a PDU session. The unicast (PDU session) is terminated in the UE 100.

First Embodiment

A first embodiment will be described.

The first embodiment mainly assumes a case in which an MBS configuration necessary for reception (hereinafter referred to as "PTM reception") of the MBS data transmitted from the gNB 200 using PTM is transmitted from the gNB 200 to the UE 100 by using unicast signalling. The unicast signalling may be referred to as Dedicated signalling. By using such a unicast configuration, an advanced MBS configuration, such as a bearer configuration, can be individually performed for the UE 100.

Note that the UE 100 in the RRC connected state can receive the unicast configuration, whereas the UE 100 in the RRC idle state or the RRC inactive state cannot receive the unicast configuration. Thus, when a case of using only the unicast configuration is assumed, the UE 100 in the RRC idle state or the RRC inactive state may not be able to perform MBS reception.

The first embodiment is an embodiment for enabling the UE 100 in the RRC idle state or the RRC inactive state to perform MBS reception even when only the unicast configuration is used.

In the first embodiment, the UE 100 in the RRC connected state receives, from the gNB 200, unicast signalling including the MBS configuration necessary for MBS reception. Such an MBS configuration includes at least one selected from the group consisting of a configuration related to an MBS bearer and a configuration related to an MBS traffic channel (for example, scheduling information of the MBS traffic channel).

The unicast signalling used for the MBS configuration is an RRC Reconfiguration message, for example. The unicast signalling used for the MBS configuration may be an RRC Release message.

The UE 100 that has transitioned from the RRC connected state to the RRC idle state or the RRC inactive state performs MBS reception by using the MBS configuration received in the RRC connected state.

In general, UE-dedicated configuration (Dedicated configuration) configured in the RRC connected state is discarded when the UE 100 leaves from the RRC connected state (particularly when the UE 100 transitions to the RRC idle state or the RRC inactive state). In contrast, the first embodiment enables the UE 100 in the RRC idle state or the RRC inactive state to perform MBS reception by maintaining, without discarding, a UE-dedicated MBS configuration configured in the RRC connected state.

Figure 8:
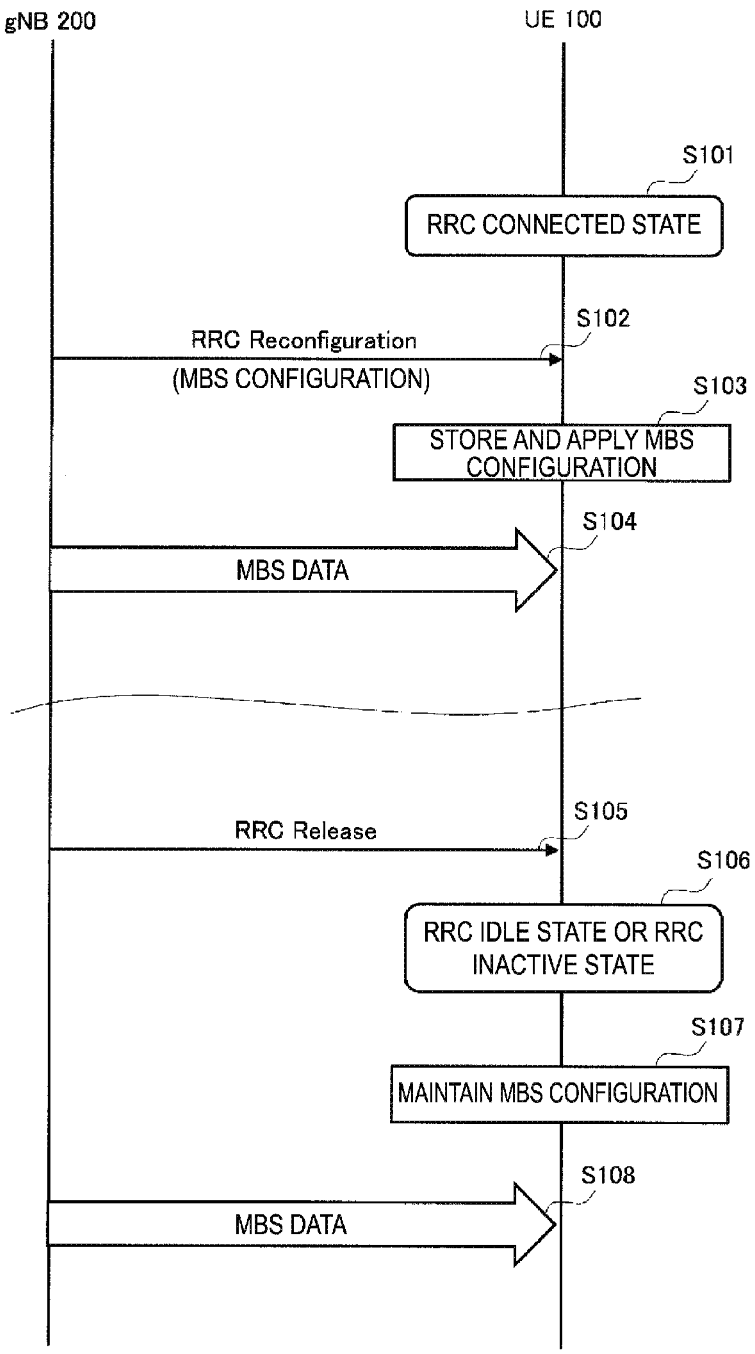
FIG. 8 is a diagram illustrating an operation example according to a first embodiment.

FIG. 8 is a diagram illustrating an operation example according to the first embodiment.

As illustrated in FIG. 8, in Step S101, the UE 100 is in the RRC connected state in a cell of the gNB 200. Here, the UE 100 may notify the gNB 200 that the UE 100 is to continue MBS reception in the RRC idle state or the RRC inactive state. Alternatively, the UE 100 may notify the gNB 200 that the UE 100 desires not to continue MBS reception in the RRC idle state or the RRC inactive state. These notifications may be notifications of desires (preferences) of the UE 100. These notifications may be associated with the MBS session identifiers (for example, TMGIs).

In Step S102, the gNB 200 transmits an RRC Reconfiguration message including the MBS configuration to the UE 100. The UE 100 receives the RRC Reconfiguration message.

The RRC Reconfiguration message may include use availability information indicating whether the MBS configuration received in the RRC connected state is available in the RRC idle state or the RRC inactive state (or whether MBS reception may be continued).

In Step S103, the UE 100 stores and applies the MBS configuration included in the received RRC Reconfiguration message.

In Step S104, the UE 100 receives MBS data (MBS traffic channel) from the gNB 200 by using the MBS configuration applied in Step S103.

Subsequently, in Step S105, the gNB 200 transmits, to the UE 100, an RRC Release message for causing the UE 100 to transition to the RRC idle state or the RRC inactive state. The UE 100 receives the RRC Release message.

The RRC Release message may include the use availability information described above. When the RRC Release message includes the use availability information, the RRC Reconfiguration message need not include the use availability information.

In Step S106, the UE 100 transitions from the RRC connected state to the RRC idle state or the RRC inactive state.

In Step S107, the UE 100 maintains, without discarding, the MBS configuration stored and applied in Step S103. When the RRC Reconfiguration message or the RRC Release message includes the use availability information and the use availability information indicates "available", the UE 100 may maintain, without discarding, the MBS configuration. In contrast, when the RRC Reconfiguration message or the RRC Release message includes the use availability information and the use availability information indicates "unavailable", the UE 100 may discard the MBS configuration.

In Step S108, the UE 100 continues MBS reception from the gNB 200.

Variation 1 of First Embodiment

Variation 1 of the first embodiment will be described.

In the first embodiment described above, because the UE 100 in the RRC idle state or the RRC inactive state cannot be controlled from the network (gNB 200), a period of validity of the MBS configuration once configured may be uncertainty. If the MBS configuration is permanently available for the UE 100 in the RRC idle state or the RRC inactive state, the network cannot change the MBS configuration despite that the network desires to change the MBS. This is because a change of the MBS configuration in the network precludes the UE 100 from performing MBS reception. Meanwhile, since the UE 100 is unable to recognize a change of the MBS configuration in the network in advance, the UE 100 recognizes the change of the MBS configuration for the first time when the UE 100 becomes unable to perform MBS reception.

In Variation 1 of the first embodiment, the UE 100 in the RRC connected state receives, from the gNB 200, information indicating a validity period of the MBS configuration from a time of reception of the MBS configuration or a time of transition to the RRC idle state or the RRC inactive state. By defining such a validity period for the MBS configuration, the problem described above can be solved.

The UE 100 in the RRC connected state may receive information indicating the validity period of the MBS configuration, and the MBS session identifier (for example, a TMGI) associated with the information indicating the validity period. With this, the validity period of the MBS configuration can be defined for each MBS session (MBS service).

The UE 100 that performs MBS reception after transitioning to the RRC idle state or the RRC inactive state may transition to the RRC connected state and acquire a new MBS configuration in response to expiration of the validity period of the MBS configuration. With this, the MBS reception can be continued even after expiration of the validity period of the MBS configuration.

Figure 9:
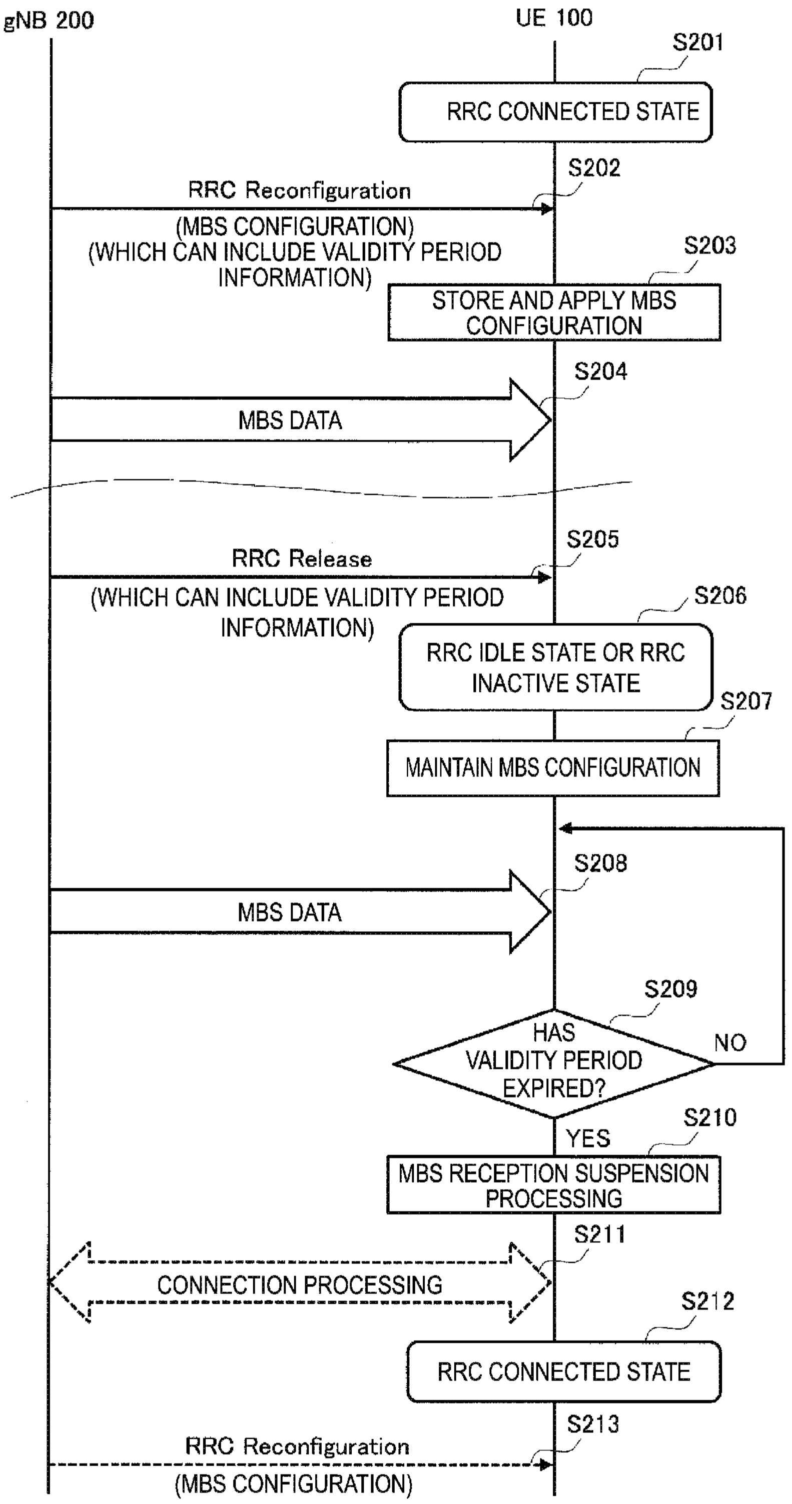
FIG. 9 is a diagram illustrating Variation 1 of the first embodiment.

FIG. 9 is a diagram illustrating Variation 1 of the first embodiment. Here, description will be given mainly on differences from the first embodiment described above.

As illustrated in FIG. 9, in Step S201, the UE 100 is in the RRC connected state in a cell of the gNB 200.

In Step S202, the gNB 200 transmits an RRC Reconfiguration message including the MBS configuration to the UE 100. The UE 100 receives the RRC Reconfiguration message.

The RRC Reconfiguration message may include information (timer value) indicating the validity period of the MBS configuration. Here, the validity period of the MBS configuration may be a validity period from the time of the configuration in Step S202. The validity period of the MBS configuration may be a validity period from a time (Step S206 to be described later) at which the UE 100 transitions to the RRC idle state or the RRC inactive state. The validity period of the MBS configuration may be configured according to a period (modification period) in which the gNB 200 does not change the MBS configuration, or a period until time at which the MBS session is scheduled to end, for example. When the validity period of the MBS configuration is the validity period from the time of the configuration in Step S202, the UE 100 starts a timer (validity period timer) in which the validity period of the MBS configuration is set, upon the configuration in Step S202.

In Step S203, the UE 100 stores and applies the MBS configuration included in the received RRC Reconfiguration message.

In Step S204, the UE 100 receives MBS data (MBS traffic channel) from the gNB 200 by using the MBS configuration applied in Step S203.

Subsequently, in Step S205, the gNB 200 transmits, to the UE 100, an RRC Release message for causing the UE 100 to transition to the RRC idle state or the RRC inactive state. The UE 100 receives the RRC Release message.

The RRC Release message may include information (timer value) indicating the validity period of the MBS configuration. Here, the validity period of the MBS configuration may be a validity period from a time at which the UE 100 transitions to the RRC idle state or the RRC inactive state (that is, from a time of reception of the RRC Release message). The validity period of the MBS configuration may be configured according to a period in which the gNB 200 does not change the MBS configuration, or a period until time at which the MBS session is scheduled to end, for example. When receiving the RRC Release message, the UE 100 starts a timer (validity period timer) in which the validity period of the MBS configuration is set.

In Step S206, the UE 100 transitions from the RRC inactive state to the RRC idle state or the RRC inactive state.

In Step S207, the UE 100 maintains, without discarding, the MBS configuration stored and applied in Step S203.

In Step S208, the UE 100 continues MBS reception from the gNB 200 until the validity period timer expires.

When the validity period timer expires (Step S209: YES), in Step S210, the UE 100 performs MBS reception suspension processing. The MBS reception suspension processing includes at least one selected from the group consisting of processing of stopping MBS reception, processing of canceling application of the MBS configuration, and processing of discarding the MBS configuration.

When the validity period timer expires and yet the UE 100 desires to continue MBS reception, in Step S211, the UE 100 performs connection processing with the gNB 200.

For example, the UE 100 in the RRC idle state initiates an RRC Setup procedure. In the RRC Setup procedure, the UE 100 may include information indicating that the UE 100 intends to acquire an MBS reception configuration as an information element (for example, Cause) in an RRC Setup Request message.

The UE 100 in the RRC inactive state initiates an RRC Resume procedure. In the RRC Resume procedure, the UE 100 may include information indicating that the UE 100 intends to acquire an MBS reception configuration as an information element (for example, Cause) in an RRC Resume Request message.

After the UE 100 transitions to the RRC connected state through the connection processing with the gNB 200 (Step S213), in Step S212, the UE 100 receives an RRC Reconfiguration message including a new MBS configuration from the gNB 200.

The present operation example assumes a case in which only the MBS configuration using unicast is used, but may assume a case in which the MBS configuration using broadcast is used as well. When the validity period timer expires (Step S209: YES), the UE 100 may perform the MBS reception suspension processing (Step S210) and also acquire the MBS configuration from an MBS control channel transmitted from the gNB 200 using broadcast.

In the present variation, the validity period of the MBS configuration may be different for each MBS session (TMGI), or may be common (only one) for all of the MBS sessions. When the validity period of the MBS configuration is different for each MBS session, the UE 100 sets the validity period corresponding to the MBS session received by the UE 100 for the timer.

Variation 2 of First Embodiment

Variation 2 of the first embodiment will be described.

As described above, when the network (gNB 200) performs a change of the MBS configuration (for example, a change of resources or the like), the UE 100 in the RRC idle state or the RRC inactive state may not be able to receive a desired MBS session.

In Variation 2 of the first embodiment, the UE 100 that performs MBS reception after transitioning to the RRC idle state or the RRC inactive state receives a notification indicating update of the MBS configuration from the gNB 200. In response to reception of the notification, the UE 100 transitions to the RRC connected state and acquires a new MBS configuration. With this, the UE 100 can continue MBS reception by using the new MBS configuration.

Figure 10:
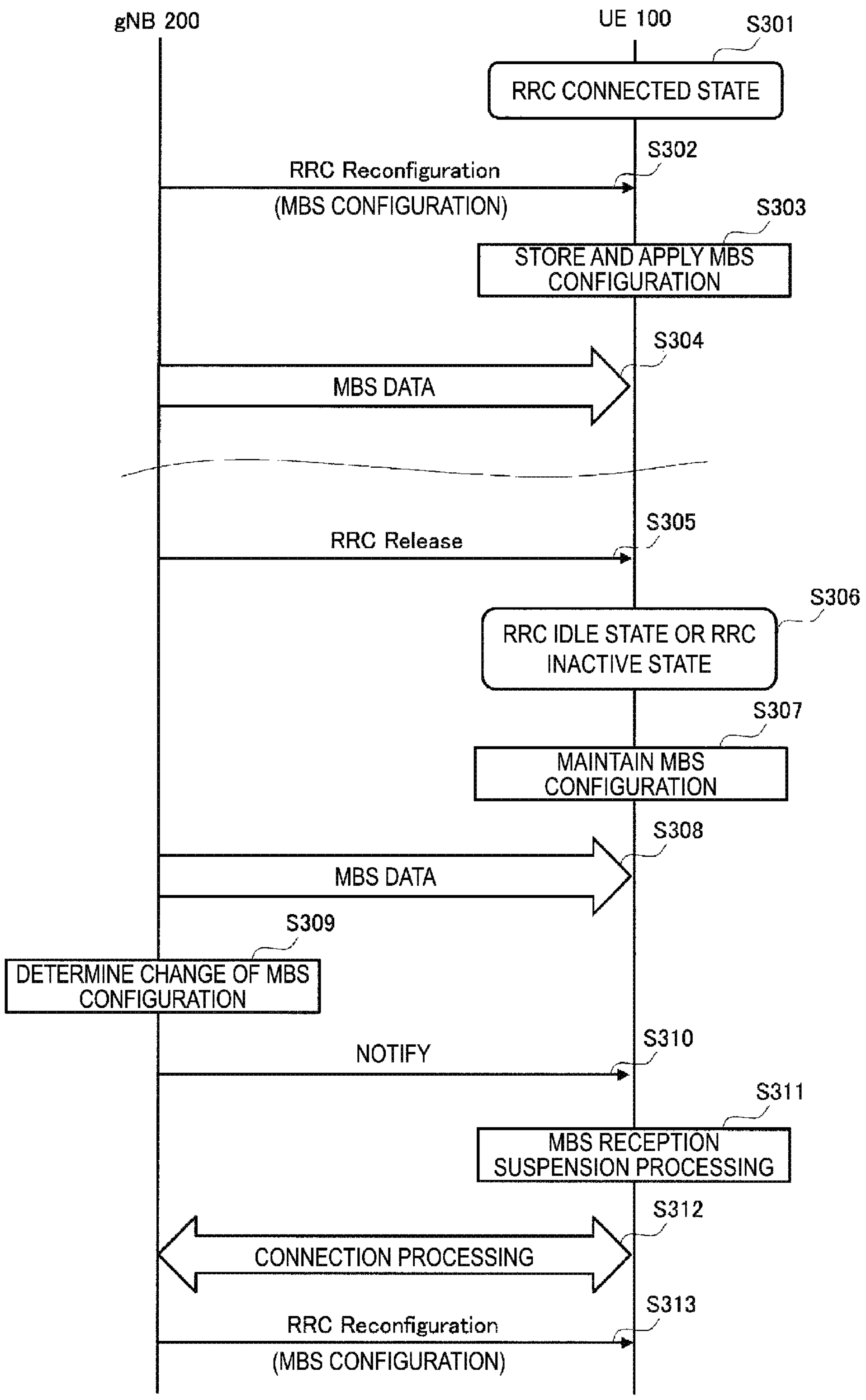
FIG. 10 is a diagram illustrating Variation 2 of the first embodiment.

FIG. 10 is a diagram illustrating Variation 2 of the first embodiment. Here, description will be given mainly on differences from the first embodiment described above.

As illustrated in FIG. 10, Steps S301 to S308 are the same as and/or similar to Steps S101 to S108 of the first embodiment described above. Note that, in Step S302, at the time of performing the MBS configuration for the UE 100, the gNB 200 may notify the UE 100 of a configuration identifier (value tag value) associated with the MBS configuration.

In Step S309, the gNB 200 determines a change of the MBS configuration. For example, the gNB 200 performs determination of at least one selected from the group consisting of a change of resources (time and frequency resources) for PTM transmission and stop or start of PTM transmission.

In Step S310, the gNB 200 performs notification to the UE 100 in the RRC idle state or the RRC inactive state.

The notification of Step S310 may be system information (System Information Block (SIB)) broadcast by the gNB 200. The notification may be a notification indicating a change in the MBS configuration and/or a notification indicating that a change is to be made within a certain period of time, or may be an indication for performing the connection processing (for example, RRC Setup). The notification may include an identifier (for example, a TMGI) of the MBS session whose MBS configuration is to be changed.

The gNB 200 may include the value tag value of the currently valid MBS configuration in the SIB. Note that the gNB 200 counts up (increments) the value tag value every time the gNB 200 changes the MBS configuration. When the value tag value notified from the gNB 200 in Step S302 and the value tag value included in the SIB received from the gNB 200 in Step S310 are the same, the UE 100 determines that the current MBS configuration is valid, whereas when those value tag values are different from each other, the UE 100 determines that the current MBS configuration is invalid.

The notification of Step S310 may be a paging message including an identifier of the MBS session whose MBS configuration is to be changed. For example, the gNB 200 includes the MBS session identifier requiring a configuration change in a paging record included in the paging message. When the paging record includes the MBS session identifier desired by the UE 100, the UE 100 determines that the MBS configuration needs to be acquired again. Note that the UE 100 may monitor regular paging occasions only. The gNB 200 transmits the paging message including the MBS session identifier in all of the paging occasions of the UE 100 in a certain period of time.

In Step S311, in response to reception of the notification of Step S310, the UE 100 that desires to continue MBS reception performs the above-described MBS reception suspension processing (Step S311), and also performs the above-described connection processing (Step S312). Then, in Step S313, the UE 100 transitions to the RRC connected state and subsequently acquires a new MBS reception configuration to continue MBS reception. Such operation is the same as and/or similar to that of Variation 1 of the first embodiment.

Variation 3 of First Embodiment

Variation 3 of the first embodiment will be described.

The present variation assumes a case in which the MBS configuration applied in the RRC connected state and the MBS configuration applied in the RRC idle state or the RRC inactive state are different from each other.

In the present variation, unicast signalling (RRC Reconfiguration message) transmitted from the gNB 200 to the UE 100 includes a first MBS configuration necessary for MBS reception in the RRC connected state and a second MBS configuration necessary for MBS reception in the RRC idle state or the RRC inactive state.

Figure 11:
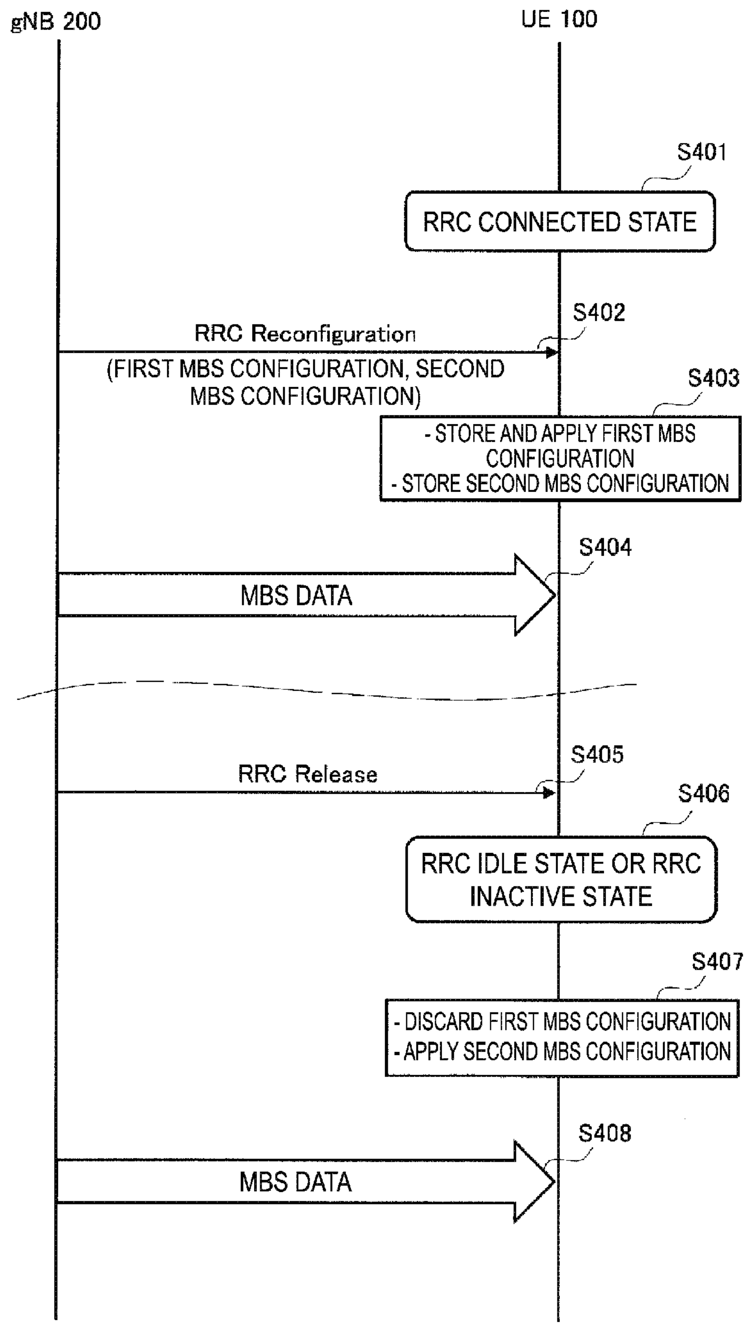
FIG. 11 is a diagram illustrating Variation 3 of the first embodiment.

FIG. 11 is a diagram illustrating Variation 3 of the first embodiment. Here, description will be given mainly on differences from the first embodiment described above.

As illustrated in FIG. 11, in Step S401, the UE 100 is in the RRC connected state in a cell of the gNB 200.

In Step S402, the gNB 200 transmits an RRC Reconfiguration message including the first MBS configuration and the second MBS configuration to the UE 100. The UE 100 receives the RRC Reconfiguration message.

The first MBS configuration is an MBS reception configuration for the RRC connected state. The first MBS configuration includes MBS bearer configuration information. In the first MBS configuration, the MBS bearer and the MBS session identifier (for example, a G-RNTI) may be associated with each other. The first MBS configuration may include an identifier indicating that this is a configuration for the RRC connected state, or may include an identifier indicating that the configuration is not to be used in the RRC idle state or the RRC inactive state.

The first MBS configuration need not necessarily be dedicated to the RRC connected state. The first MBS configuration may include an identifier indicating that the configuration may be used in the RRC idle state or the RRC inactive state as well.

In contrast, the second MBS configuration is an MBS reception configuration for the RRC idle state or the RRC inactive state. The second MBS configuration includes configuration information (for example, scheduling information) related to the MBS traffic channel. The second MBS configuration may include an identifier indicating that this is a reception configuration for the RRC idle state or the RRC inactive state, or may include an identifier indicating that the configuration is not to be used in the RRC connected state. In the second MBS configuration, a configuration for the RRC idle state and a configuration for the RRC inactive state may be separately provided.

The second MBS configuration need not necessarily be dedicated to the RRC idle state or the RRC inactive state. The second MBS configuration may include an identifier indicating that the configuration may be used in the RRC connected state as well.

In Step S403, the UE 100 stores and applies the first MBS configuration included in the received RRC Reconfiguration message, and stores the second MBS configuration.

In Step S404, the UE 100 receives MBS data from the gNB 200 by using the first MBS configuration applied in Step S403. Here, the UE 100 may apply the second MBS configuration that is valid also for the RRC connected state.

The UE 100 does not apply the second MBS configuration that is valid only for the RRC idle state or the RRC inactive state.

Subsequently, in Step S405, the gNB 200 transmits, to the UE 100, an RRC Release message for causing the UE 100 to transition to the RRC idle state or the RRC inactive state. The UE 100 receives the RRC Release message.

In Step S406, the UE 100 transitions from the RRC connected state to the RRC idle state or the RRC inactive state.

In Step S407, the UE 100 performs processing according to the identifier included in the first MBS configuration and the identifier included in the second MBS configuration. For example, the UE 100 discards the first MBS configuration that is valid only for the RRC connected state. Note that, when the UE 100 is in the RRC inactive state, the UE 100 may retain the first MBS configuration. The UE 100 retains (does not discard) the second MBS configuration that is valid for the RRC idle state or the RRC inactive state, or continues application thereof (or applies again).

In Step S408, the UE 100 receives MBS data from the gNB 200 by using the second MBS configuration applied in Step S407.

Second Embodiment

A second embodiment will be described mainly on differences from the first embodiment.

The second embodiment assumes a case in which the MBS configuration using unicast and the MBS configuration using broadcast coexist. When such two configuration methods are present, the UE 100 needs to appropriately determine which of the methods is to be employed for acquisition of the MBS configuration in MBS reception.

In the second embodiment, the gNB 200 transmits, to the UE 100, a broadcast message including at least one selected from the group consisting of a first identifier (first MBS session identifier) indicating a first MBS session in which the first MBS configuration necessary for MBS reception is provided using unicast signalling and a second identifier (second MBS session identifier) indicating a second MBS session in which the second MBS configuration necessary for MBS reception is provided using broadcast signalling. The broadcast message may be an SIB transmitted on a broadcast control channel, or may be MBS control information transmitted on an MBS control channel.

With this, the UE 100 can appropriately determine which of the methods, out of the unicast configuration and the broadcast configuration, is to be employed for acquisition of the MBS configuration in MBS reception. The UE 100 receives, from the gNB 200, one of the first MBS configuration (that is, the MBS configuration using unicast) and the second MBS configuration (that is, the MBS configuration using broadcast), based on the broadcast message from the gNB 200 and the desired MBS session of the UE 100.

Figure 12:
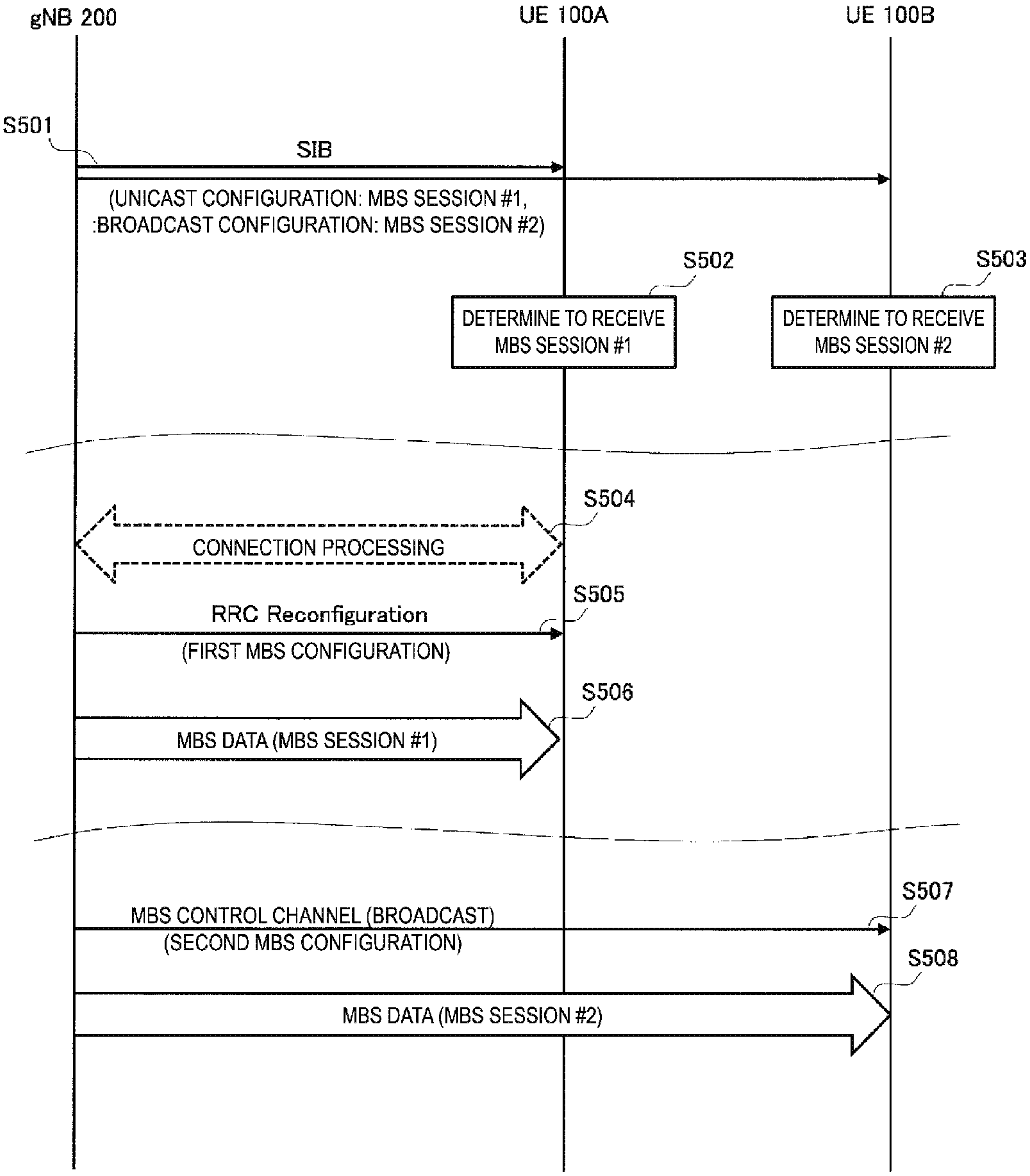
FIG. 12 is a diagram illustrating an operation example according to a second embodiment.

FIG. 12 is a diagram illustrating an operation example according to the second embodiment.

As illustrated in FIG. 12, in Step S501, the gNB 200 uses an SIB to notify the UEs 100 (a UE 100A and a UE 100B) of a service (first MBS session identifier) in which the MBS configuration needs to be received using unicast signalling (for example, an RRC Reconfiguration message) and/or a service (second MBS session identifier) in which the configuration can be received using broadcast signalling (for example, an SC-MCCH). In other words, the gNB 200 uses an SIB (or an SC-MCCH) to broadcast methods of acquiring the MBS configuration for each MBS session identifier.

FIG. 12 illustrates an example in which an MBS session (first MBS session identifier) to which the unicast configuration is applied is MBS session #1 and an MBS session (second MBS session identifier) to which the broadcast configuration is applied is MBS session #2.

For example, the MBS session to which the unicast configuration is applied is an MBS session belonging to multicast-based services (for example, group communication). In contrast, the MBS session to which the broadcast configuration is applied is an MBS session belonging to broadcast-based services (for example, services related to broadcasting, IPTV).

In Step S502, the UE 100A that desires to receive a multicast-based service determines to receive MBS session #1, based on the SIB from the gNB 200. In contrast, in Step S503, the UE 100B that desires to receive a broadcast-based service determines to receive MBS session #2, based on the SIB from the gNB 200.

In Step S504, when the UE 100A is in the RRC idle state or the RRC inactive state, the UE 100A performs processing (connection processing) of transitioning to the RRC connected state to allow the UE 100A to receive the first MBS configuration.

In Step S505, the UE 100A receives an RRC Reconfiguration message including the first MBS configuration from the gNB 200.

In Step S506, the UE 100A applies the first MBS configuration received in Step S505, and thereby receives MBS data of MBS session #1 from the gNB 200.

In contrast, in Step S507, the UE 100B receives an MBS control channel including the second MBS configuration from the gNB 200. For example, when the UE 100B is in the RRC connected state, the UE 100B does not expect to acquire the MBS configuration on an RRC Reconfiguration message from the gNB 200 and attempts to receive an MBS control channel (for example, an SC-MCCH). The UE 100 in the RRC connected state may transmit Release Assistance Information (RAI) to the gNB 200 to have its RRC connection released, and transition to the RRC idle state or the RRC inactive state.

In Step S508, the UE 100B applies the second MBS configuration received in Step S507, and thereby receives MBS data of MBS session #2 from the gNB 200.

Note that, in the present operation example, it can be considered as the gNB 200 broadcasting MBS session identifiers that can be provided by the gNB 200 itself. When the UE 100 is interested in receiving an MBS session that cannot be provided by the gNB 200, the UE 100 may establish a unicast session with the 5GC 20 and thereby receive MBS data of the MBS session.

In the present operation example, the gNB 200 may transmit, to the UE 100, a broadcast message further including a third identifier (third MBS session identifier) indicating a third MBS session in which the MBS configuration is provided using both of unicast signalling and broadcast signalling.

Third Embodiment

A third embodiment will be described mainly on differences from the first and second embodiments.

The third embodiment assumes a case in which a plurality of MBS control channels (for example, a plurality of SC-MCCHs) are configured in one cell of the gNB 200. With this, for example, the MBS control channels can be appropriately used depending on a service requirement of the MBS session.

When such a plurality of MBS control channels are configured, it is conceivable that RNTIs for PDCCHs for transmitting respective MBS control channels are different from one another. Specifically, when a certain MBS control channel is transmitted in a physical layer of the gNB 200, by transmitting a PDCCH to which an RNTI for the MBS control channel is applied to the UE 100, resources for a PDSCH for carrying the MBS configuration are allocated to the UE 100.

In this manner, when RNTIs are different for each MBS control channel, it is necessary to specify which RNTI is used for transmitting which MBS control channel.

In the third embodiment, the gNB 200 that provides a plurality of MBS control channels in one cell transmits, to the UE 100, a broadcast message including an RNTI used for reception of the MBS control channel in each of the plurality of MBS control channels. The broadcast message may be an SIB transmitted on a broadcast control channel.

The RNTI used for reception of the MBS control channel may be an RNTI (hereinafter referred to as an "SC-RNTI") applied to the MBS control channel or may be an RNTI (hereinafter referred to as an "SC-N-RNTI") applied to a Change Notification of the MBS control channel.

Figure 13:
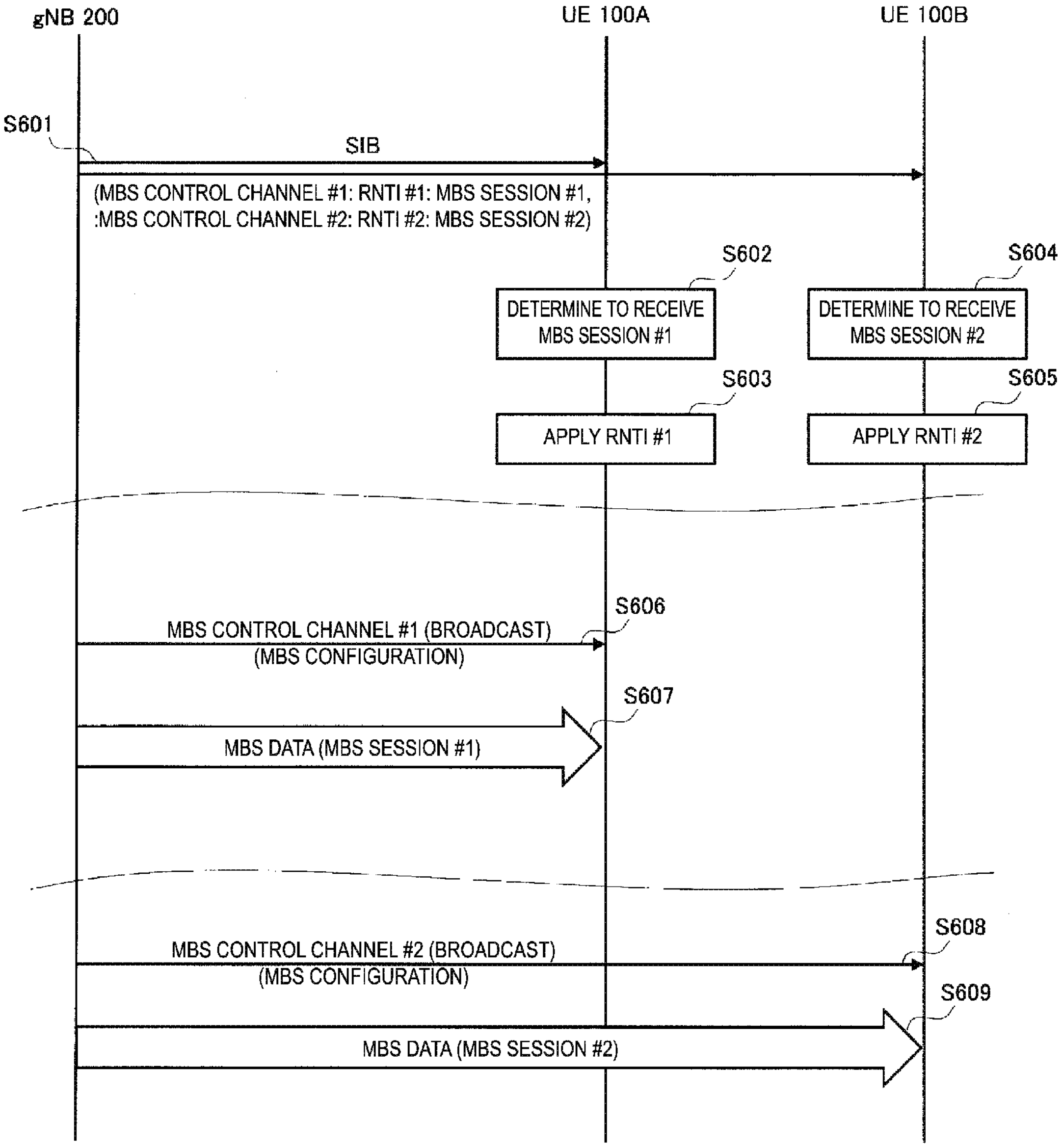
FIG. 13 is a diagram illustrating an operation example according to a third embodiment.

FIG. 13 is a diagram illustrating an operation example according to the third embodiment.

As illustrated in FIG. 13, in Step S601, the gNB 200 broadcasts an SIB including configuration information of each MBS control channel. The configuration information may include an SC-RNTI value for each MBS control channel, or may include an SC-RNTI value for each MBS session identifier. The configuration information may include an SC-N-RNTI value for each MBS control channel, or may include an SC-N-RNTI value for each MBS session identifier.

In the example illustrated in FIG. 13, the SIB includes a set of RNTI (SC-RNTI and/or SC-N-RNTI) #1 and MBS session identifier #1 regarding MBS control channel #1. The SIB includes a set of RNTI (SC-RNTI and/or SC-N-RNTI) #2 and MBS session identifier #2 regarding MBS control channel #2.

In Step S602, the UE 100A determines to receive MBS session #1, based on the SIB from the gNB 200. Then, in Step S603, the UE 100A applies RNTI #1 corresponding to MBS session #1 and attempts to receive MBS control channel #1, based on the SIB from the gNB 200.

In contrast, in Step S604, the UE 100B determines to receive MBS session #2, based on the SIB from the gNB 200. Then, in Step S605, the UE 100B applies RNTI #2 corresponding to MBS session #2 and attempts to receive MBS control channel #2, based on the SIB from the gNB 200.

In Step S606, the UE 100A receives MBS control channel #1 from the gNB 200. In Step S607, the UE 100A receives MBS data of MBS session #1 from the gNB 200 by using the MBS configuration included in MBS control channel #1 received in Step S606.

In contrast, in Step S608, the UE 100B receives MBS control channel #2 from the gNB 200. In Step S609, the UE 100B receives MBS data of MBS session #2 from the gNB 200 by using the MBS configuration included in MBS control channel #2 received in Step S608.

Fourth Embodiment

A fourth embodiment will be described mainly on differences from the first to third embodiments. The fourth embodiment is an embodiment related to cell reselection performed by the UE 100 in the RRC idle state or the RRC inactive state.

LTE introduces a mechanism in which cell reselection is performed, with a frequency for providing an MBMS session of interest or being received having the highest priority. However, in the mechanism, which frequency (or which cell) is reselected is dependent upon the UE 100, and is uncontrollable from the point of view of the network. Thus, a scheme allowing the UE 100 to receive the desired MBS session while enabling network control is desired.

In the fourth embodiment, the gNB 200 transmits cell reselection control information including pieces of priority information indicating priorities for respective cells or frequencies in cell reselection, and MBS session identifiers associated with the pieces of priority information. Based on the cell reselection control information from the gNB 200, the UE 100 in the RRC idle state or the RRC inactive state performs cell reselection by using a piece of priority information corresponding to a desired MBS session identifier of the UE 100. With this, cell reselection control allowing the UE 100 to receive the desired MBS session while enabling network control can be implemented.

Figure 14:
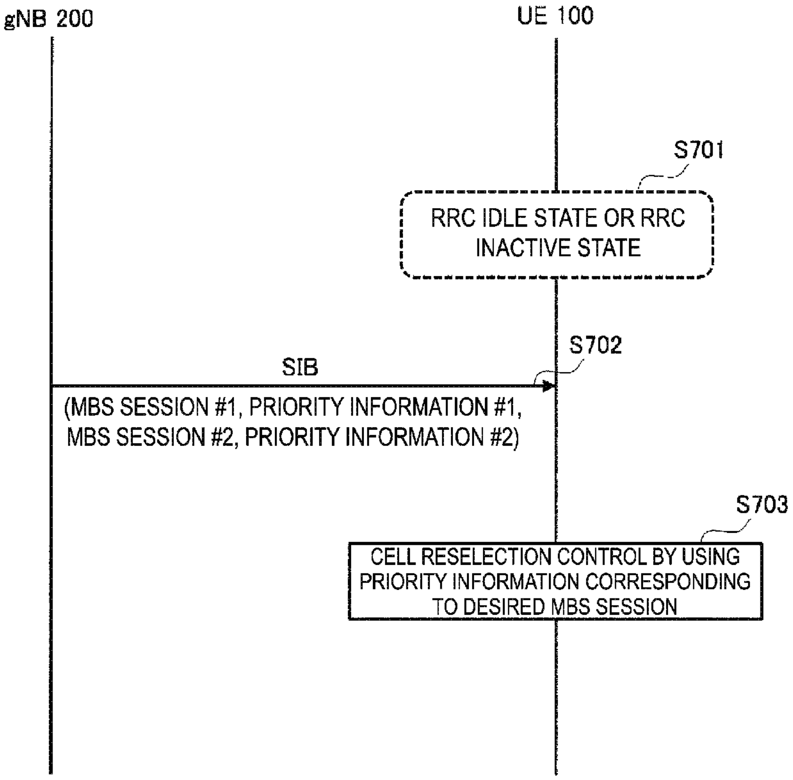
FIG. 14 is a diagram illustrating an operation example according to a fourth embodiment.

FIG. 14 is a diagram illustrating an operation example according to the fourth embodiment.

As illustrated in FIG. 14, in Step S701, the UE 100 may be in the RRC idle state or the RRC inactive state.

In Step S702, the gNB 200 notifies the UE 100 of pieces of priority information (cell reselection priority) for respective MBS sessions. For example, the gNB 200 broadcasts an SIB including pieces of priority information associated with MBS sessions. Alternatively, the gNB 200 may transmit, to the UE 100, unicast signalling (for example, an RRC Release message) including pieces of priority information associated with MBS sessions. When the RRC Release message including the pieces of priority information associated with the MBS sessions is transmitted to the UE 100, the UE 100 transitions from the RRC connected state to the RRC idle state or the RRC inactive state, in response to reception of the RRC Release message. The following describes an example of using an SIB; however, an RRC Release message may be used instead of the SIB.

The SIB includes a plurality of sets each including an MBS session identifier and a piece of priority information of a cell and/or a frequency. In the example illustrated in FIG. 14, priority information #1 is associated with MBS session identifier #1, and priority information #2 is associated with MBS session identifier #2. Priority information #1 is information indicating that frequency #1 corresponds to a high priority, frequency #2 corresponds to an intermediate priority, and frequency #3 corresponds to a low priority. Priority information #2 is information indicating that frequency #1 corresponds to a low priority, frequency #2 corresponds to an intermediate priority, and frequency #3 corresponds to a high priority. For example, prioritization is that a high frequency is prioritized for an MBS session in which high-speed communication is required, and a low frequency is prioritized for an MBS session in which high reliability is required. Note that these pieces of priority information may be associated with cell IDs instead of frequencies.

In Step S703, based on the desired MBS session of the UE 100 and the SIB from the gNB 200, the UE 100 controls cell reselection by using a piece of priority information corresponding to the desired MBS session of the UE 100. In the cell reselection control, the UE 100 preferentially selects a frequency (or a cell) given a high priority in the priority information.

Here, in the UE 100, the desired MBS session may be notified from an upper layer (NAS layer) to a lower layer (AS layer), and the AS layer may perform cell reselection control using the desired MBS session. When a plurality of desired MBS sessions are present, reception priorities for respective MBS sessions are notified from an upper layer (NAS layer) to a lower layer (AS layer), and the lower layer (AS layer) may perform cell reselection control by using a piece of priority information corresponding to the MBS session having the highest reception priority.

Note that, in the present operation example, the SIB may further include known priority information that is not associated with the MBS session identifiers. Such known priority information is used by legacy UEs that do not support MBS and UEs 100 that are not interested in MBS reception.

When the MBS sessions are associated with network slices, the gNB 200 may broadcast pieces of priority information of frequencies and/or cells for respective network slices. Information of association between the MBS session identifiers (TMGIs or the like) and network slice identifiers (S-NSSAIs or the like) may be notified from the core network to the UE 100 and/or the gNB 200. The UE 100 performs cell (re) selection processing according to a piece of priority information of a frequency and/or a cell in the network slice associated with the MBS session that the UE 100 desires to receive.

In such an example, the "MBS session identifier" in the fourth embodiment described above may be replaced with the "network slice identifier". Specifically, the gNB 200 transmits cell reselection control information including pieces of priority information indicating priorities for respective cells or frequencies in cell reselection, and network slice identifiers associated with the pieces of priority information. Based on the cell reselection control information from the gNB 200, the UE 100 in the RRC idle state or the RRC inactive state performs cell reselection by using a piece of priority information corresponding to a desired network slice of the UE 100.

Fifth Embodiment

A fifth embodiment will be described mainly on differences from the first to fourth embodiments. The fifth embodiment is an embodiment related to RRC Reestablishment performed by the UE 100 in the RRC connected state.

When the UE 100 in the RRC connected state detects a radio link failure (RLF) while receiving an MBS session, initiates RRC reestablishment processing, and selects a cell that does not provide the MBS session in cell selection during the RRC reestablishment processing, MBS reception may be interrupted. In the fifth embodiment, a cell that provides the MBS session is preferentially selected in cell selection during the RRC reestablishment processing. Accordingly, continuity of MBS reception is enhanced.

In the fifth embodiment, when the UE 100 receiving an MBS session in the RRC connected state initiates RRC reestablishment processing, the UE 100 performs cell selection in the RRC reestablishment processing. In cell selection, the UE 100 preferentially selects a cell that provides the MBS session. With this, continuity of MBS reception can be enhanced.

Figure 15:
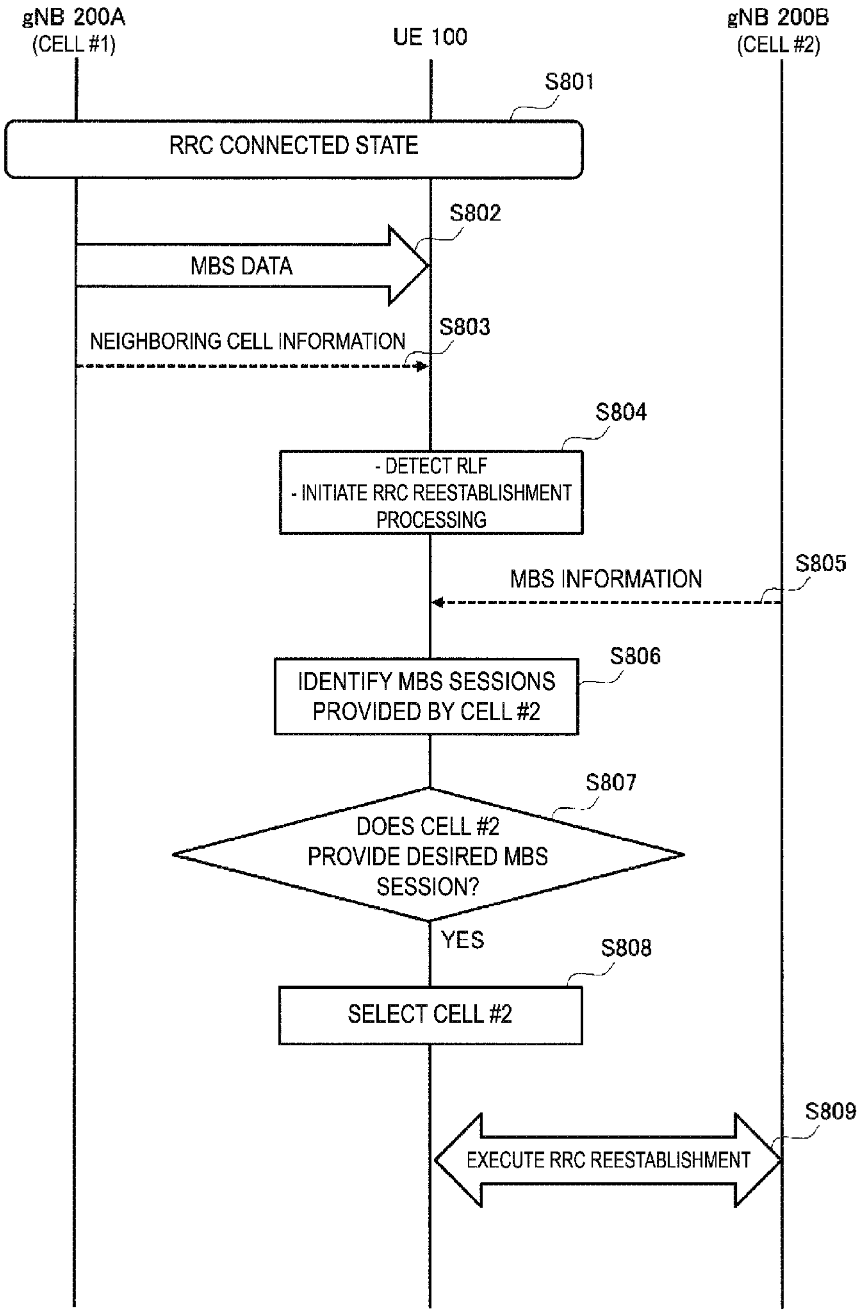
FIG. 15 is a diagram illustrating an operation example according to a fifth embodiment.

FIG. 15 is a diagram illustrating an operation example according to the fifth embodiment.

As illustrated in FIG. 15, in Step S801, the UE 100 is in the RRC connected state in cell #1 of a gNB 200A.

In Step S802, the UE 100 receives MBS data of an MBS session from the gNB 200A.

In Step S803, the UE 100 may receive, from the gNB 200A, neighboring cell information including MBS session identifiers of MBS sessions provided by cell #2 being a neighboring cell.

In Step S804, the UE 100 detects an RLF with the gNB 200A, and initiates RRC reestablishment processing.

In Step S805, when performing cell search, the UE 100 may receive MBS information broadcast by the gNB 200B (cell #2). The MBS information may be an SIB including the MBS session identifiers of the MBS sessions provided by cell #2.

In Step S806, the UE 100 identifies the MBS sessions provided by the gNB 200A (cell #2), based on the information received in Step S803 or Step S805.

In Step S807, the UE 100 determines whether the gNB 200A (cell #2) provides the MBS session that the UE 100 has received in Step S802.

When the UE 100 determines that the gNB 200A (cell #2) provides the MBS session that the UE 100 has received in Step S802 (Step S807: YES) in Step S808, the UE 100 selects cell #2.

In Step S809, the UE 100 accesses selected cell #2 and performs RRC reestablishment, and thereby continues reception of the MBS session that the UE 100 has been receiving (is interested in).

Sixth Embodiment

A sixth embodiment will be described mainly on differences from the first to fifth embodiments.

In NR, by configuring a Bandwidth part (BWP) narrower than frequency bandwidth of one cell for the UE 100, operating bandwidth of the UE 100 can be limited. Such a BWP may be introduced for MBS. When such a BWP for MBS is introduced, it is conceivable that the BWP for MBS is notified to the UE 100 using the MBS configuration. However, when the MBS configuration does not include information of the BWP for MBS, the UE 100 is unable to identify the BWP for MBS, which may result in an unexpected error.

In the sixth embodiment, the UE 100 receives information indicating an initial BWP used by the gNB 200 from the gNB 200. The initial BWP refers to a BWP notified using an SIB, and is a BWP used by the UE 100 to perform initial access to the gNB 200. Until the UE 100 receives a BWP configuration for the UE 100 from the gNB 200, the UE 100 uses the initial BWP.

The UE 100 receives the MBS configuration necessary for MBS reception from the gNB 200. Here, when the MBS configuration does not include the BWP configuration, the UE 100 performs MBS reception by using the initial BWP. In this manner, by defining a behavior of the UE 100 in a case where the MBS configuration has a defect, unexpected errors can be made less liable to occur.

Figure 16:
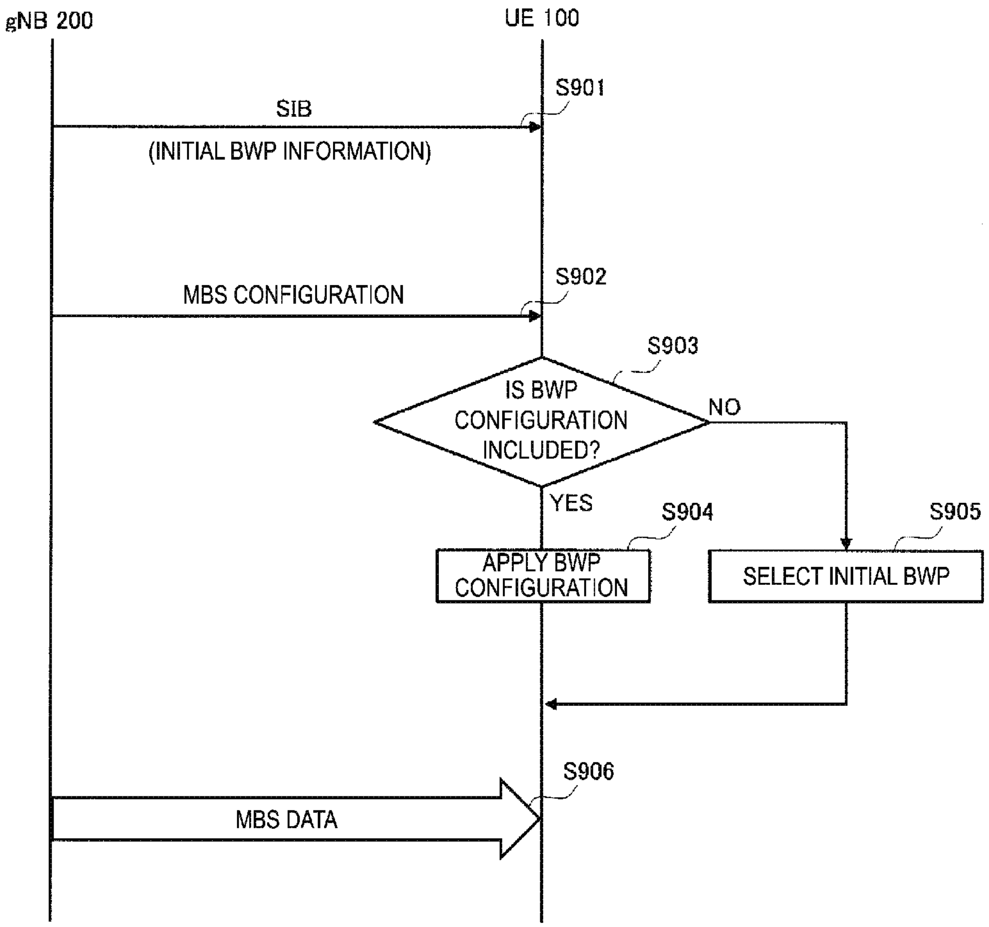
FIG. 16 is a diagram illustrating an operation example according to a sixth embodiment.

FIG. 16 is a diagram illustrating an operation example according to the sixth embodiment.

As illustrated in FIG. 16, in Step S901, the UE 100 receives an SIB including initial BWP information from the gNB 200.

In Step S902, the UE 100 receives an MBS configuration from the gNB 200.

In Step S903, the UE 100 determines whether the MBS configuration received from the gNB 200 includes a configuration of a BWP for MBS.

When the MBS configuration received from the gNB 200 includes the configuration of the BWP for MBS (Step S903: YES), in Step S904, the UE 100 applies the configuration of the BWP for MBS.

In contrast, when the MBS configuration received from the gNB 200 does not include the configuration of the BWP for MBS (Step S903: NO), in Step S905, the UE 100 determines (assumes) that MBS data of PTM is to be transmitted in the initial BWP. A default value of the BWP for MBS may be configured as the initial BWP.

In Step S906, the UE 100 attempts to receive the MBS data in the configured BWP.

OTHER EMBODIMENTS

The embodiments and the variations described above can not only be separately and independently implemented, but can also be implemented in combination of two or more of such examples.

In the embodiments described above, an example in which the base station is an NR base station (gNB) is described; however, the base station may be an LTE base station (eNB). The base station may be a relay node such as an Integrated Access and Backhaul (IAB) node. The base station may be a Distributed Unit (DU) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or a system on a chip (SoC)).

Embodiments have been described above in detail with reference to the drawings, but specific configurations are not limited to those described above, and various design variation can be made without departing from the gist of the present disclosure.

Supplementary Note

Introduction

Revised work items have been approved that are related to NR multicast and broadcast services (MBS). The purposes of the work items are as follows.

- Define broadcast/multicast RAN basic functions of the UE in the RRC connected state.
- Define a group scheduling mechanism that allows the UE to receive broadcast/multicast services.
- The purpose includes defining an extended function required to allow simultaneous operation with unicast reception.
- Define support for dynamic change of broadcast/multicast service delivery between multicast (PTM) and unicast (PTP) with predefined UE service continuity.
- Define support for basic mobility with service continuity.
- On the assumption that the gNB-CU includes required adjustment functions (such as functions hosted by MCE), define changes required for RAN architectures and interfaces in consideration of the results of the SA2 SI in broadcast/multicast.
- Define changes required to improve the reliability of broadcast/multicast services, for example, by UL feedback. The level of reliability should be based on the requirements of the application/service provided.
- Study support for the dynamic control of the broadcast/multicast transmission area in one gNB-DU and define what is required to enable the support, if any.
- Define broadcast/multicast RAN basic functions of the UE in the RRC idle/RRC inactive state.
- Define changes required to enable the UE in the RRC idle/RRC inactive state to receive Point to Multipoint transmission in order to maximize commonalities maintained between the RRC connected state and the RRC idle/RRC inactive state for configuration of PTM reception.

In RAN2 #111-e, a number of companies proposed reusing the LTE SC-PTM mechanism for the UE in the idle/inactive state; however, as the chairman summarized as follows, a number of companies thought a significant difference was present in solutions for connected and idle/inactive states.

Chairman: A number of companies think a significant difference is present in solutions for idle and connected states. Further studies need to be conducted as to what it means ultimately.

Chairman's observations: Many proposals to reuse (to a significant extent or 100%) LTE SC-PTM for idle/inactive NR. Some companies propose connecting to and controlling idle/inactive delivery as well, for example.

In this supplementary note, considerations on the control plane of NR MBS will be discussed.

DISCUSSION

In the LTE SC-PTM, configurations are provided by two messages, i.e., SIB 20 and SC-MCCH. The SIB 20 provides SC-MCCH scheduling information, and the SC-MCCH provides SC-MTCH scheduling information including the G-RNTI and the TMGI, and neighbor cell information.

Figure 17:
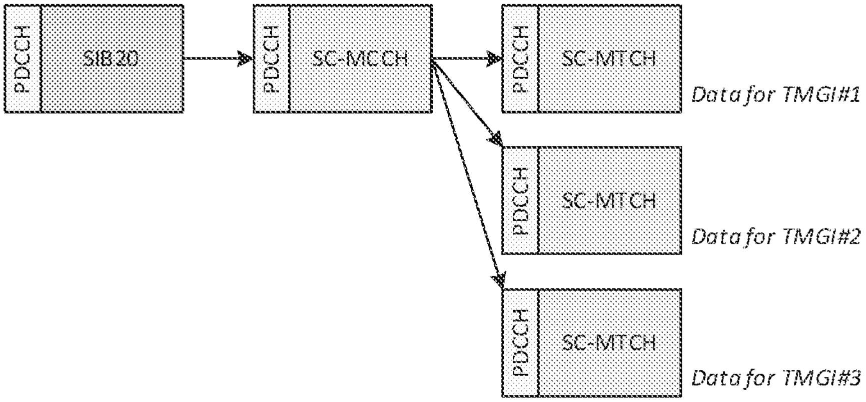
FIG. 17 is a diagram illustrating a two-stage configuration in LTE SC-PTM.

As illustrated in FIG. 17, an advantage of the LTE two-stage configuration is that the SC-MCCH scheduling is independent of the SIB 20 scheduling in terms of repetition period, duration, change period, and the like. The two-stage configuration facilitates frequent scheduling/update of the SC-MCCH, particularly for delay sensitive services and/or UEs that are delayed in participating in the session. According to the WID, one of the applications is group communication or the like, and thus it also applies to the NR MBS.

Observation 1: In LTE, the two-stage configuration using the SIB 20 and the SC-MCCH is useful for different scheduling operations for these control channels. This is also useful for the NR MBS.

Proposal 1: RAN2 should agree on use of the two-stage configuration with different messages for the NR MBS, such as the SIB 20 and the SC-MCCH for the SC-PTM.

In addition to Proposal 1, the NR MBS is assumed to support various types of use cases described in the WID. It is appreciated that the NR MBS should be appropriately designed for a variety of requirements ranging from delay sensitive applications such as mission critical applications and V2X to delay tolerant applications such as IoT, in addition to the other aspects of requirements ranging from lossless application such as software delivery to UDP type streaming such as IPTV.

Therefore, the design of the control channel should take into account flexibility and the resource efficiency of the control channel. Otherwise, for example, when one control channel includes configuration of a delay tolerant service and configuration of a delay sensitive service, the control channel needs to be frequently scheduled in order to satisfy delay requirements from the delay sensitive service. This may cause more signalling overheads.

An object A of the SA2 SI relates to enabling of general MBS services via 5GS, and specified use cases possible to receive benefits from this function include (but are not limited to) public safety, mission critical applications, V2X applications, transparent IPv4/IPv6 multicast delivery, IPTV, wireless software delivery, group communications, and IoT applications.

Observation 2: The NR MBS control channel needs to be flexible to various types of use cases and to have high resource efficiency.

Figure 18:
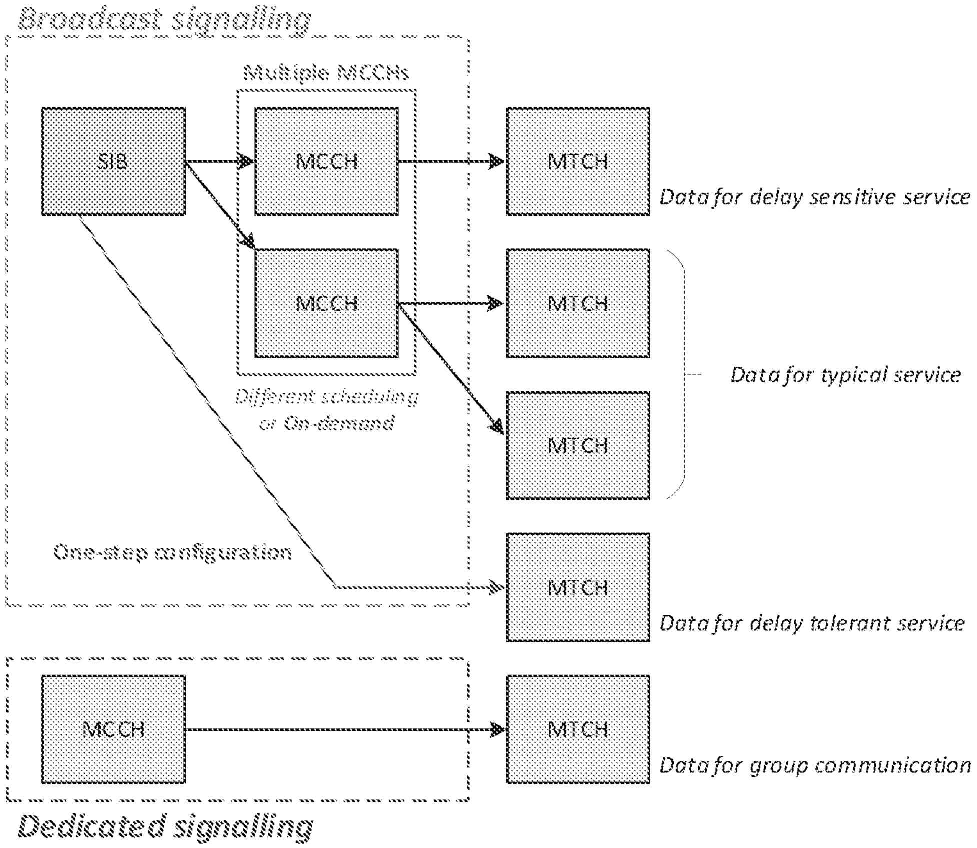
FIG. 18 is a diagram illustrating a configuration diagram capable of NR MBS.

As one possibility, as illustrated in FIG. 18, whether configuration channels need to be separated in different use cases is studied. For example, one control channel frequently provides a delay sensitive service, and another control channel infrequently provides a delay tolerant service. The LTE SC-PTM is limited in that one cell includes only one SC-MCCH. However, the NR MBS may assume more use cases than LTE, and thus should be devoid of such limitation. When a plurality of SC-MCCHs are allowed within the cell, each SC-MCCH includes a scheduling configuration with a different repetition period which can be optimized for a specific service. How to identify the SC-MCCH that provides a service in which the UE takes interest needs further study.

Proposal 2: RAN2 should discuss whether the NR MBS cell supports a plurality of control channels, as is the case with a plurality of SC-MCCHs the support of which is not included in LTE.

A new paradigm of NR is support for on-demand SI transmission. This concept may be reused for the SC-MCCH in the NR MBS, i.e., on-demand SC-MCCH. For example, the SC-MCCH for delay tolerant services is provided on demand, thus enabling resource consumption for signalling to be optimized. Of course, the network includes another option for providing the SC-MCCH for delay sensitive services, periodically, i.e., not based on a demand.

Proposal 3: RAN2 should discuss an option provided when the control channel is provided on an on-demand basis, as is the case with the on-demand SC-MCCH that is not included in LTE.

As another possibility, as illustrated in FIG. 13, merging the above-described messages, i.e., one-stage configuration, may be further studied. For example, the SIB provides SC-MTCH scheduling information directly, i.e., without the SC-MCCH. This will provide optimization for delay tolerant services and/or power sensitive UE. For example, the UE may request the SIB (on demand), and the gNB may start providing the SIB and the corresponding service after requests from a plurality of UEs. These UEs do not need to monitor the SC-MCCH that is repeatedly broadcast.

Proposal 4: RAN2 should discuss options such as direct provision of the traffic channel configuration in the SIB when multicast reception with no use of the SC-MCCH (i.e., one-stage configuration) is supported.

Dedicated Signalling-Based Configuration

Some companies proposed that the MBS configuration be provided using dedicated signalling only. This suggests that, although dedicated signalling has simplicity for the UEs in the RRC connected state in multicast services such as group communication, for the UEs in the idle/inactive state, the UEs invariably need to transition to the RRC connected state before receiving MBS services even if these UEs are interested only in broadcast services. This may cause unnecessary power consumption in the UEs, and may reduce future guarantees such as support of free broadcasting services in future releases. Accordingly, it is assumed that the MBS configuration using broadcast signalling is to be a baseline as in proposal 1 to proposal 4, in a manner the same as and/or similar to LTE SC-PTM.

Note that, as illustrated in FIG. 13, it is assumable that, when the control channels can be provided using the RRC reconfiguration, this shall bring about flexibility in implementation and a deployment policy of the network. For example, when being necessary for business operators or the like not broadcasting MBS control channels and not providing broadcast services, the network may only determine to provide configurations using dedicated signalling. As another example, when a target cell provides the MBS configuration using a handover command, this is beneficial for service continuity during handover.

Accordingly, in RAN2, whether the RRC reconfiguration provides MBS control channels needs to be studied.

Proposal 5: In RAN2, an option of a case in which the RRC reconfiguration provides the SC-MCCH which does not exist in LTE needs to be studied.

Interest Indication/Counting

In LTE eMBMS, in order that the network perform appropriate determinations of MBMS data delivery including start/stop of MBMS sessions, two types of methods for collecting a UE reception/interest service are specified, i.e., MBMS interest indication (MII) and MBMS counting. MII triggered by the UE includes information related to an MBMS frequency of interest, an MBMS service of interest, an MBMS priority, and MBMS ROM (reception-dedicated mode). A counting response triggered by the network via a counting request for a specific MBMS service includes information related to an MBSFN area and an MBMS service of interest.

These methods were introduced for various purposes. MII is mainly used by the network in order to ensure that the UE can continuously receive a service that the UE is interested in while being in the connected state. In contrast, counting is used to enable the network to determine whether a sufficient number of UEs are interested in receiving a service.

Observation 3: In LTE e MBMS, two types of UE assistance information are introduced for different purposes. In other words, MBMS interest indication is introduced for scheduling of NB, and MBMS counting is introduced for session control of MCE.

In a case of NR MBS, multicast services for use cases of group communication and the like are expected, and the network has full knowledge related to the MBS service that the UE in the connected state is receiving/interested in, and thus assistance information from the UE is not necessary, such as the network's determination regarding PTP/PTM delivery. However, our understanding is that this does not apply to broadcast services and the UEs in the idle/inactive state. In a case of broadcast services in particular, NR MBS still has the same problem as that solved by MII and counting in LTE eMBMS, i.e., observation 3. Thus, in RAN2, whether the assistance information, such as MII and counting, is useful for NR MBS needs to be studied.

As described in WID, since ROM and SFN are not supported, in Rel-17, it is noted that MBMS ROM information of MII and information related to the MBSFN area of the counting response are not necessary.

Proposal 6: In RAN2, for example, introduction of the UE assistance information of NR MBS, such as MBMS interest indication and/or MBMS counting, needs to be agreed upon.

When proposal 6 can be agreed upon, it is worthwhile to carry out a study on extended functions, in addition to LTE eMBMS. In LTE eMBMS, even when most of the UEs receive broadcast services in the RRC idle state, information of neither MII nor counting can be collected from the UEs in the idle state. To our understanding, this is one of the problems that LTE eMBMS has from the viewpoint of session control and resource efficiency.

In NR MBS, the same problem may be present in the UEs in the idle/inactive state. For example, the network cannot know whether the UEs in the idle/inactive state are receiving/interested in broadcast services. Thus, even if no UE receiving services is present, PTM transmission may be continued. If the gNB recognizes interest of the UEs in the idle/inactive state, such unnecessary PTM can be avoided. Conversely, if PTM stops while UEs in the idle/inactive state receiving services are still present, a plurality of UEs may simultaneously request connection.

Accordingly, it is worthwhile to carry out a study as to whether to introduce a mechanism for collecting the UE assistance information, specifically MBMS counting, from the UE in the idle/inactive state. Needless to say, it is desirable that the UEs in the idle/inactive state be capable of reporting information without transitioning to RRC connected. For example, PRACH resource partitioning associated with the MBS service may be achieved when being introduced to such a report.

Proposal 7: In RAN2, whether the UE assistance information such as MBMS counting is also collected from the UE in the idle/inactive state needs to be studied.

The invention claimed is:

1. A communication control method used in a mobile communication system providing a multicast and broadcast service (MBS) from a base station to a user equipment, the communication control method comprising:

receiving, by the user equipment and from the base station, information indicating an initial Bandwidth part (BWP) used by the base station;

receiving, by the user equipment and from the base station, configuration information used for MBS reception;

determining, by the user equipment, whether the received configuration information comprises a configuration of a frequency resource used for the MBS;

when it is determined that the received configuration information does not comprise the configuration of the frequency resource used for the MBS, performing, by the user equipment, the MBS reception by using the initial BWP; and when it is determined that the received configuration information comprises the configuration of the frequency resource used for the MBS, performing, by the user equipment, the MBS reception by using the frequency resource used for the MBS.

2. A user equipment provided a multicast and broadcast service (MBS) from a base station, the user equipment comprising a processor and a memory coupled to the processor, the processor configured to:

receive, from the base station, information indicating an initial Bandwidth part (BWP) used by the base station;

receive, from the base station, configuration information used for MBS reception;

determine, by the user equipment, whether the received configuration information comprises a configuration of a frequency resource used for the MBS;

when it is determined that the received configuration information does not comprise the configuration of the frequency resource used for the MBS, perform the MBS reception by using the initial BWP; and when it is determined that the received configuration information comprises the configuration of the frequency resource used for the MBS, perform, by the user equipment, the MBS reception by using the frequency resource used for the MBS.

3. An apparatus configured to control a user equipment provided a multicast and broadcast service (MBS) from a base station, the apparatus comprising a processor and a memory coupled to the processor, the processor configured to:

receive, from the base station, information indicating an initial Bandwidth part (BWP) used by the base station;

receive, from the base station, configuration information used for MBS reception;

determine, by the user equipment, whether the received configuration information comprises a configuration of a frequency resource used for the MBS;

when it is determined that the received configuration information does not comprise the configuration of the frequency resource used for the MBS, perform the MBS reception by using the initial BWP; and when it is determined that the received configuration information comprises the configuration of the frequency resource used for the MBS, performing, by the user equipment, the MBS reception by using the frequency resource used for the MBS.

* * * * *